(12) United States Patent
Chang et al.

(10) Patent No.: US 11,137,853 B2
(45) Date of Patent: *Oct. 5, 2021

(54) TOUCH PANEL AND CONTROLLING METHOD OF TOUCH PANEL

(71) Applicant: HIMAX TECHNOLOGIES LIMITED, Tainan (TW)

(72) Inventors: Yaw-Guang Chang, Tainan (TW); Wei-Song Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,722

(22) Filed: Aug. 10, 2020

(65) Prior Publication Data
US 2021/0096685 A1  Apr. 1, 2021

Related U.S. Application Data

(63) Continuation of application No. 16/384,850, filed on Apr. 15, 2019, now Pat. No. 10,768,744.

(60) Provisional application No. 62/685,287, filed on Jun. 15, 2018, provisional application No. 62/687,216, filed on Jun. 19, 2018.

(51) Int. Cl.
*G06F 3/041* (2006.01)
*G06F 3/045* (2006.01)
*G05F 3/10* (2006.01)

(52) U.S. Cl.
CPC .............. *G06F 3/0416* (2013.01); *G05F 3/10* (2013.01); *G06F 2203/04102* (2013.01)

(58) Field of Classification Search
CPC ....... G06F 3/0412; G06F 3/0446; G06F 3/044
See application file for complete search history.

(56) References Cited

U.S. PATENT DOCUMENTS 9,024,913 B1 * 5/2015 Jung .................... G06F 3/04184
345/174
2013/0021303 A1  1/2013  Martin
(Continued)

FOREIGN PATENT DOCUMENTS

CN   103748535 A   4/2014
CN   107562255 A   1/2018
(Continued)

*Primary Examiner* — Nan-Ying Yang
(74) *Attorney, Agent, or Firm* — Winston Hsu (57) ABSTRACT

The present invention provides a touch panel and a controlling method thereof. The controlling method comprises: during a display period of the touch panel, turning on a bias voltage generation circuit to generate a bias voltage signal, turning on a reverse bias voltage generation circuit to generate a reverse bias voltage signal, and turning off a modulating voltage generation circuit; during a touch period of the touch panel, turning off the bias voltage generation circuit, the reverse bias voltage generation circuit and turning on the modulating voltage generation circuit to generate a modulating voltage signal, wherein the modulating voltage signal is same as a touch sensing signal of the touch panel; using a first capacitor to couple the modulating voltage signal to the bias voltage generation circuit; and using a second capacitor to couple the modulating voltage signal to the reverse bias voltage generation circuit.

8 Claims, 8 Drawing Sheets

(56) References Cited

U.S. PATENT DOCUMENTS

| | | |
|---|---|---|
| 2013/0176273 A1 | 7/2013 | Li |
| 2013/0221856 A1* | 8/2013 | Soto ................. H05B 45/60 315/152 |
| 2014/0210779 A1 | 7/2014 | Katsuta |
| 2015/0130755 A1* | 5/2015 | Jain ................. G06F 3/0445 345/174 |
| 2016/0203760 A1* | 7/2016 | Kwon ............... G09G 3/3275 345/214 |
| 2018/0004329 A1 | 1/2018 | So |

FOREIGN PATENT DOCUMENTS

| | | |
|---|---|---|
| JP | 2014-67345 A | 4/2014 |
| TW | 201333798 A1 | 8/2013 |
| TW | 201435703 A | 9/2014 |
| TW | 201543325 A | 11/2015 |
| WO | 2016/119376 A1 | 8/2016 |

* cited by examiner

FIG. 1 PRIOR ART $V_{BULKP}$
VGH ----------------

$V_{BULKN}^{VGL}$ ----------------

Pure display application
(VGH-VGL<32V)

FIG. 2 PRIOR ART

Touch operates at
negative voltage
(VGH-VGL<32V-$V_{sense}$)

Touch operates at
positive voltage
(VGH-VGL<32V-$V_{sense}$)

$V_{BULKP}$
VGH $V_{BULKN}$ VGL

Pure display application
(VGH-VGL<32V)

TOUCH PANEL AND CONTROLLING METHOD OF TOUCH PANEL

CROSS REFERENCE TO RELATED APPLICATIONS

This application is a continuation application of U.S. application Ser. No. 16/384,850, filed on Apr. 15, 2019, which claims priority of U.S. Provisional Application No. 62/687,216, filed on Jun. 19, 2018 and also claims priority of U.S. Provisional Application No. 62/685,287, filed on Jun. 15, 2018. The entire contents of these related applications are incorporated herein by reference.

BACKGROUND OF THE INVENTION

1. Field of the Invention

The present invention relates to a touch panel, and more particularly, to a touch panel and a controlling method of the touch panel.

2. Description of the Prior Art

Figure 1:
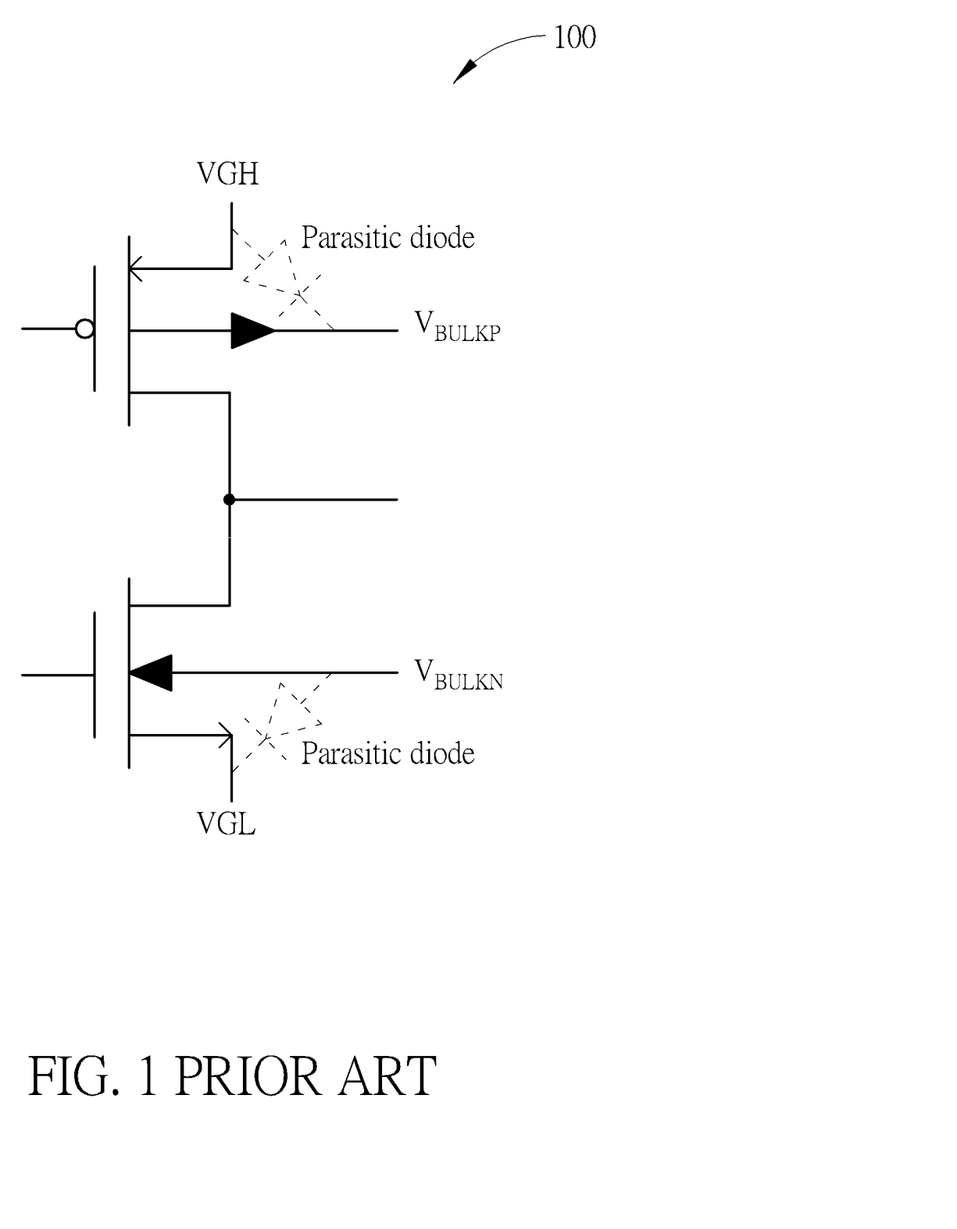
FIG. 1 shows a simplified diagram of a gate signal control circuit 100 in a conventional touch panel.
Figure 2:
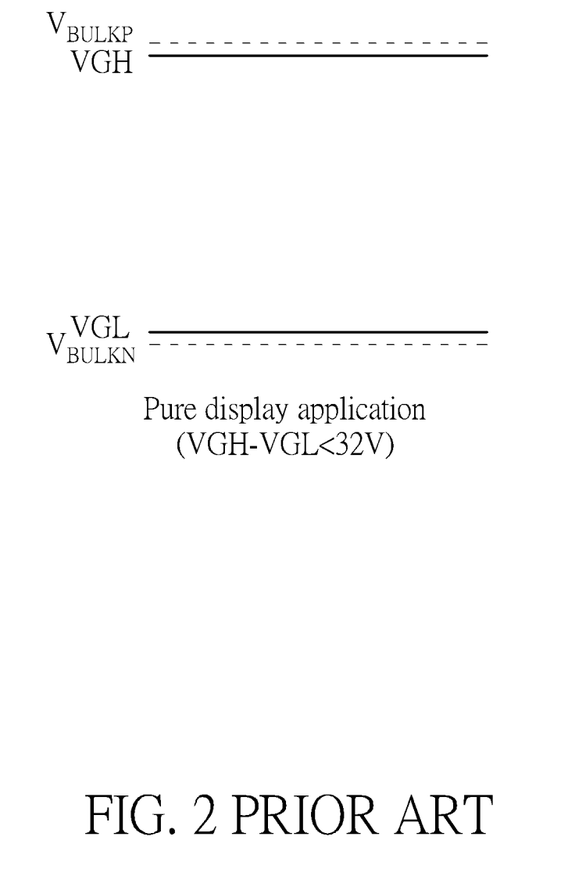
FIG. 2 shows a simplified wave diagram of signals of the conventional touch panel in a pure display application.
Figure 3:
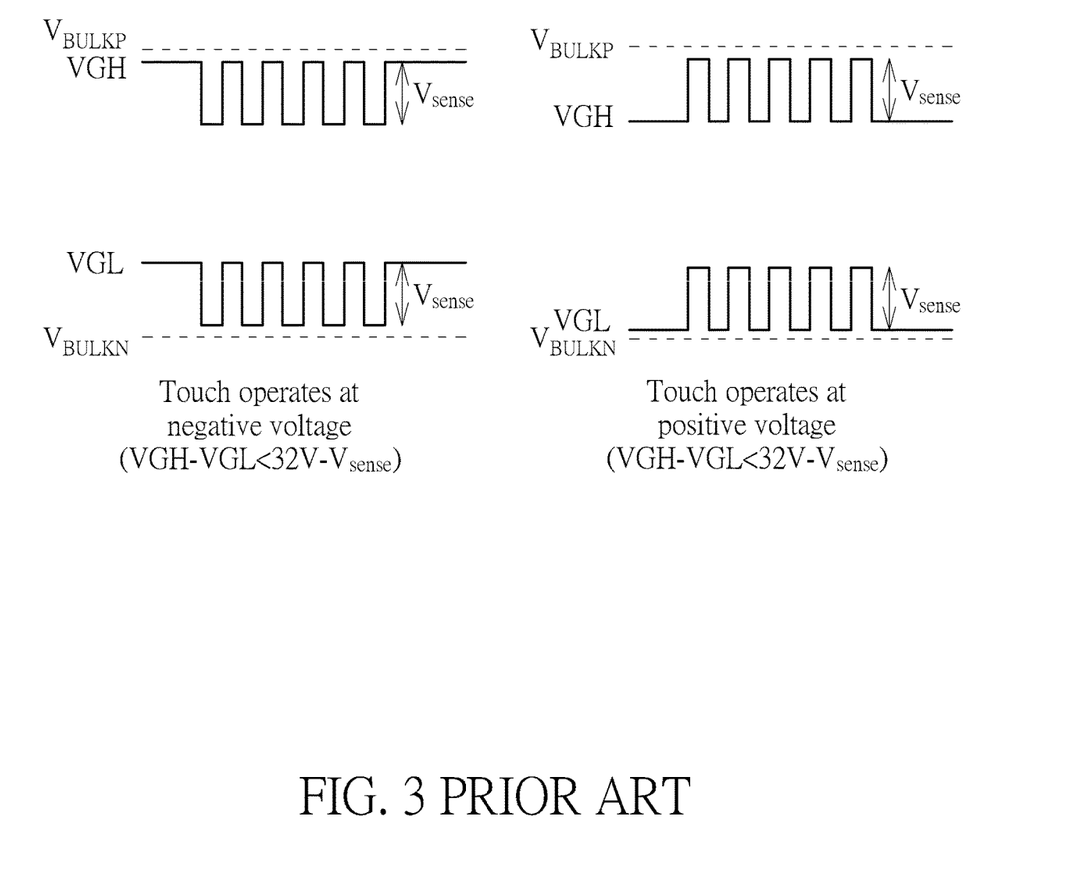
FIG. 3 shows a simplified wave diagram of signals of the conventional touch panel in in-cell and touch applications.

Please refer to FIG. 1. FIG. 1 shows a simplified diagram of a gate signal control circuit 100 in a conventional touch panel. The gate signal is a high voltage (HV) signal in application, and its high level is called positive voltage (VGH), and its low level is called negative voltage (VGL). In order to avoid the parasitic diode conduction, $V_{BULKP} \geq VGH$ and $V_{BULKN} \leq VGL$ must be satisfied. In addition, the maximum voltage limit is 32V in a general HV process. Therefore, VGH-VGL needs to be less than 32V without considering the in-cell application. In addition, the cross-voltage limitation of the MOS components must be satisfied, and thus as shown in FIG. 2, for a pure display application, $V_{BULKP}-V_{BULKN}$ needs to be less than 32V for the cross-voltage limitation of the MOS components, and the maximum VGH-VGL limit is also 32V (when $V_{BULKP}=VGH$ and $V_{BULKN}=VGL$). However, as shown in FIG. 3, for in-cell and touch applications, in order to satisfy $V_{BULKP}-V_{BULKN}$ less than 32V, the maximum VGH-VGL limit has to become 32V-Vsense (Vsense is a touch sensing signal), so the range in which the voltage can be selected is limited to a smaller range.

SUMMARY OF THE INVENTION

It is therefore one of the objectives of the present invention to provide a touch panel and a controlling method of the touch panel, so as to solve the above problem.

In accordance with an embodiment of the present invention, a touch panel is disclosed. The touch panel comprises: a bias voltage generation circuit, a reverse bias voltage generation circuit, a modulating voltage generation circuit, a first capacitor and a second capacitor. The bias voltage generation circuit is utilized for being turned on to generate a bias voltage signal during a display period of the touch panel and being turned off during a touch period of the touch panel. The reverse bias voltage generation circuit is utilized for being turned on to generate a reverse bias voltage signal during the display period of the touch panel and being turned off during the touch period of the touch panel. The modulating voltage generation circuit is utilized for being turned on to generate a modulating voltage signal during the touch period of the touch panel and being turned off during the display period of the touch panel, wherein the modulating voltage signal is same as a touch sensing signal of the touch panel. The first capacitor is utilized for coupling the modulating voltage signal to an output terminal of the bias voltage generation circuit. The second capacitor is utilized for coupling the modulating voltage signal to an output terminal of the reverse bias voltage generation circuit.

In accordance with an embodiment of the present invention, a controlling method of a touch panel is disclosed. The controlling method comprises: during a display period of the touch panel, turning on a bias voltage generation circuit to generate a bias voltage signal, turning on a reverse bias voltage generation circuit to generate a reverse bias voltage signal, and turning off a modulating voltage generation circuit; during a touch period of the touch panel, turning off the bias voltage generation circuit, the reverse bias voltage generation circuit, and turning on the modulating voltage generation circuit to generate a modulating voltage signal, wherein the modulating voltage signal is same as a touch sensing signal of the touch panel; using a first capacitor to couple the modulating voltage signal to an output terminal of the bias voltage generation circuit; and using a second capacitor to couple the modulating voltage signal to an output terminal of the reverse bias voltage generation circuit.

Briefly summarized, the touch panel and the controlling method of the touch panel disclosed by the present invention can maintain the same VGH-VGL limit (VGH-VGL<32V) as in pure display applications even in in-cell and touch applications.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ".

Figure 4:
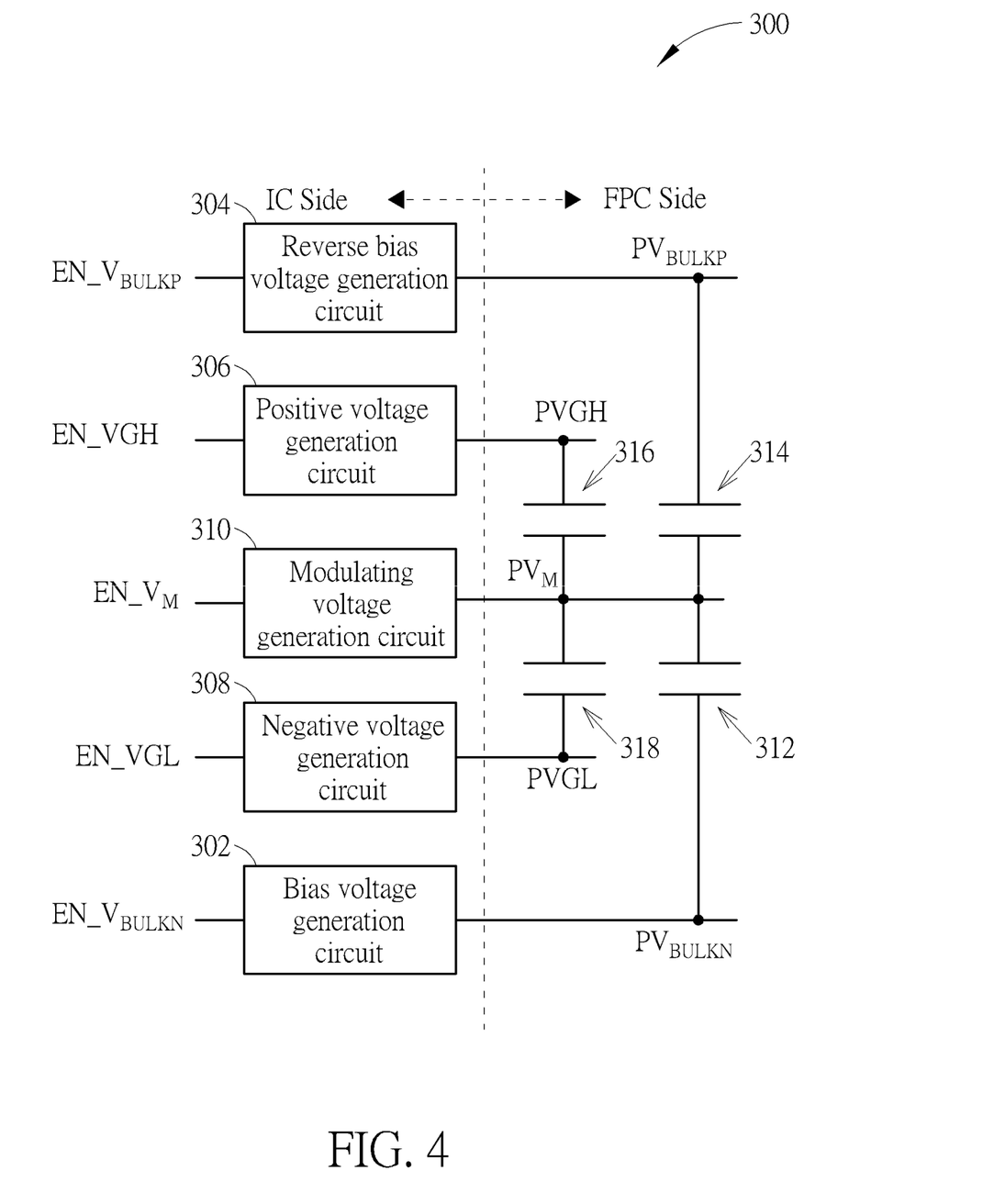
FIG. 4 shows a simplified block diagram of a touch panel 300 in accordance with an embodiment of the present invention, wherein the in-cell touch panel 300 can be an in-cell touch panel.
Figure 5:
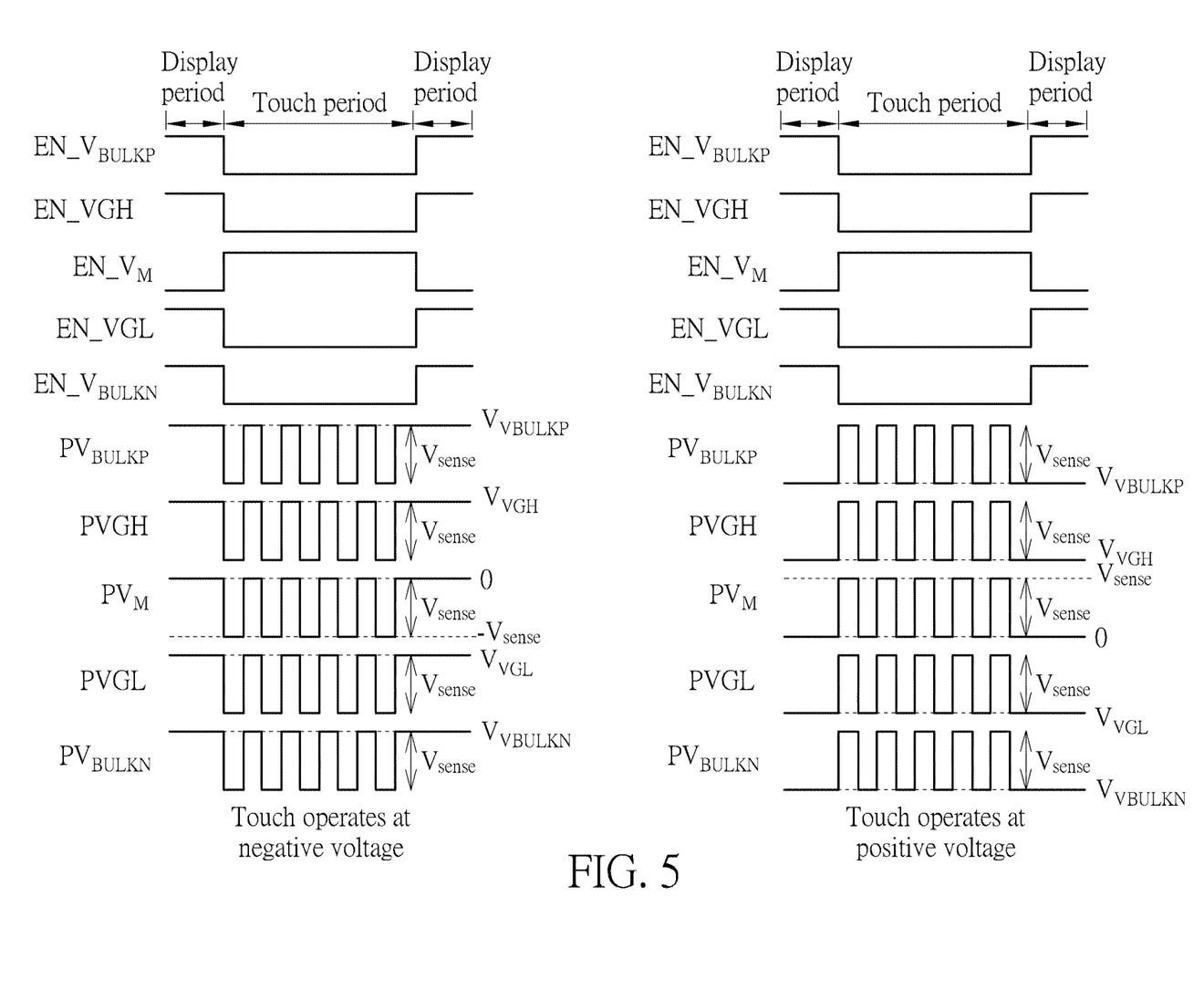
FIG. 5 shows a simplified wave diagram of signals generated in the touch panel in FIG. 4.

Please refer to FIG. 4 and FIG. 5. FIG. 4 shows a simplified block diagram of a touch panel 300 in accordance with an embodiment of the present invention, wherein the in-cell touch panel 300 can be an in-cell touch panel. FIG. 5 shows a simplified wave diagram of signals generated in the touch panel 300. The touch panel 300 comprises: a bias voltage generation circuit 302, a reverse bias voltage generation circuit 304, a positive voltage generation circuit 306, a negative voltage generation circuit 308, a modulating voltage generation circuit 310, a first capacitor 312, a second capacitor 314, a third capacitor 316, and a fourth capacitor 318. The bias voltage generation circuit 302, the reverse bias voltage generation circuit 304, the positive voltage generation circuit 306, the negative voltage generation circuit 308, and the modulating voltage generation circuit 310 can be integrated in a touch controller of the touch panel 300, and the first capacitor 312, the second capacitor 314, the third capacitor 316, and the fourth capacitor 318 can be formed in a flexible printed circuit (FPC) of the touch panel 300.

The bias voltage generation circuit 302 is utilized for being turned on (i.e. the signal $EN\_V_{BULKN}$ is high) to generate a bias voltage signal $V_{BULKN}$ during a display period of the touch panel 300 and being turned off (i.e. the signal $EN\_V_{BULKN}$ is low) during a touch period of the touch panel 300. The reverse bias voltage generation circuit 304 is utilized for being turned on (i.e. the signal $EN\_V_{BULKP}$ is high) to generate a reverse bias voltage signal $V_{BULKP}$ during the display period of the touch panel 300 and being turned off (i.e. the signal $EN\_V_{BULKP}$ is low) during the touch period of the touch panel 300. The positive voltage generation circuit 306 is utilized for being turned on (i.e. the signal EN_VGH is high) to generate a positive voltage signal VGH during the display period of the touch panel 300 and being turned off (i.e. the signal EN_VGH is low) during the touch period of the touch panel 300. The negative voltage generation circuit 308 is utilized for being turned on (i.e. the signal EN_VGL is high) to generate a negative voltage signal VGL during the display period of the touch panel 300 and being turned off (i.e. the signal EN_VGL is low) during the touch period of the touch panel 300. The modulating voltage generation circuit 310 is utilized for being turned on (i.e. the signal $EN\_V_M$ is high) to generate a modulating voltage signal $V_M$ during the touch period of the touch panel 300 and being turned off (i.e. the signal $EN\_V_M$ is low) during the display period of the touch panel 300, wherein the modulating voltage signal $V_M$ is same as a touch sensing signal $V_{sense}$ of the touch panel 300 (i.e. the amplitude and frequency of the modulating voltage signal $V_M$ are same as those of the touch sensing signal $V_{sense}$), and touch can operate at negative voltage or positive voltage as shown in FIG. 5.

Figure 6:
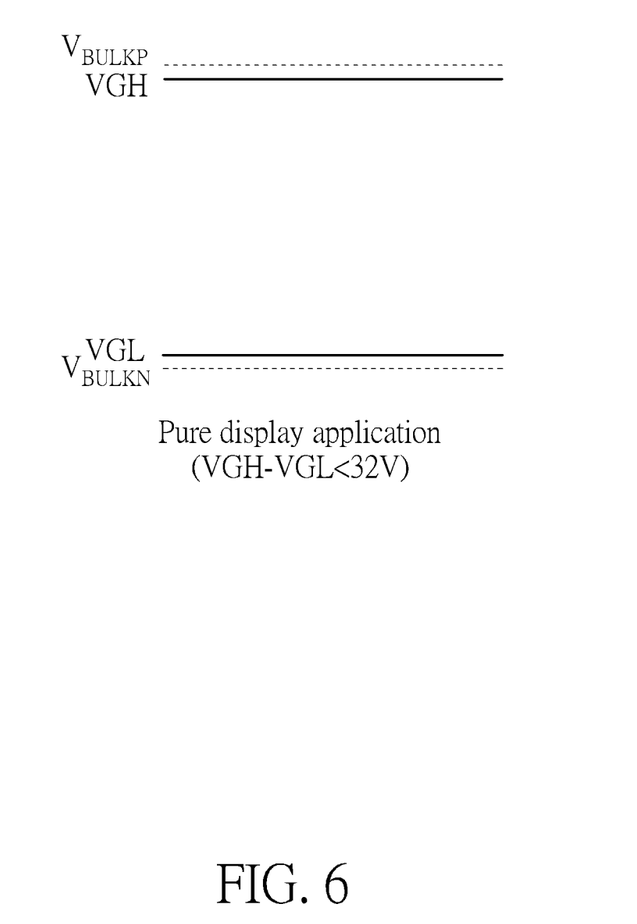
FIG. 6 shows a simplified wave diagram of signals of the touch panel in FIG. 4 in a pure display application.
Figure 7:
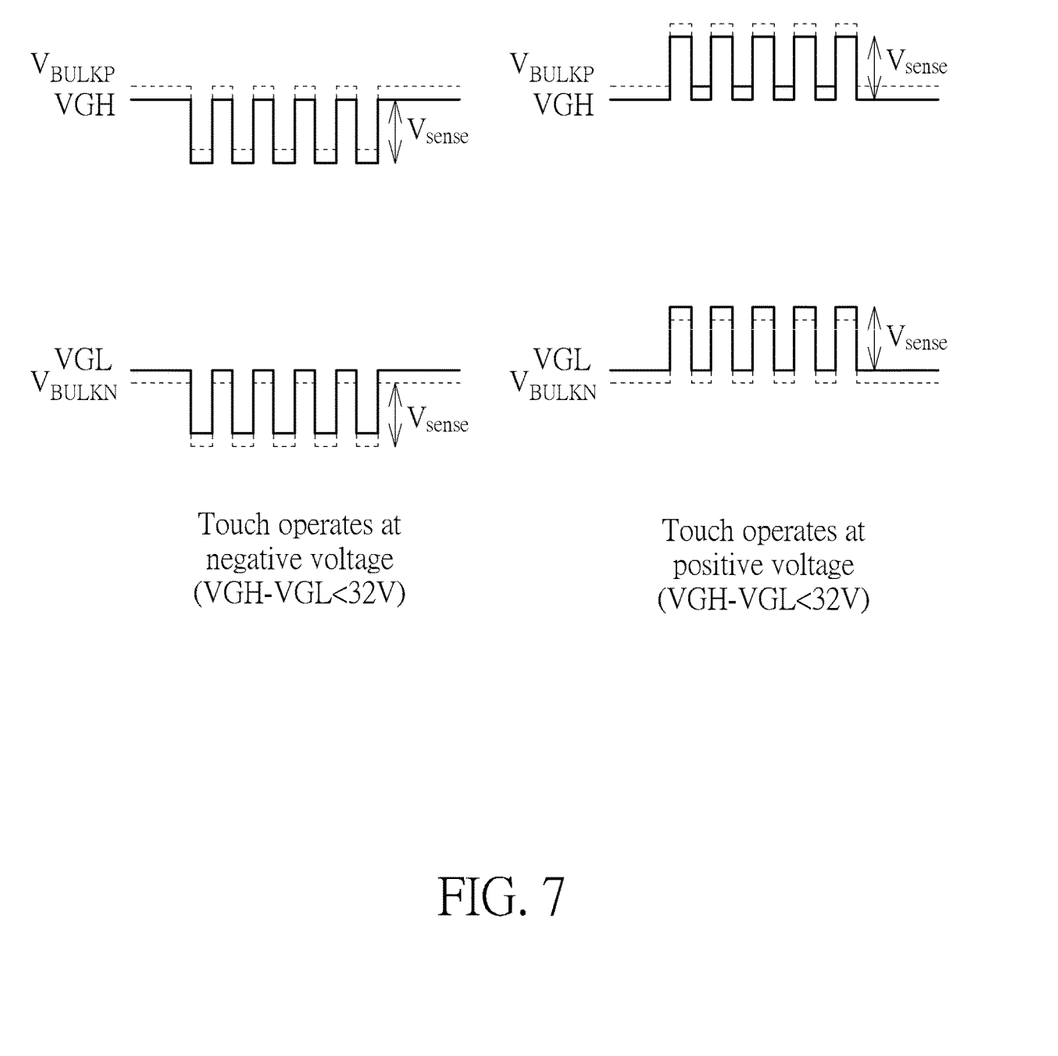
FIG. 7 shows a simplified wave diagram of signals of the touch panel in FIG. 4 in in-cell and touch applications.

The first capacitor 312 is coupled between an output terminal $PV_{BULKN}$ of the bias voltage generation circuit 302 and an output terminal $PV_M$ of the modulating voltage generation circuit 310, and utilized for making the output terminal $PV_{BULKN}$ of the bias voltage generation circuit 302 in a high-Z status and coupling the modulating voltage signal $V_M$ to the output terminal $PV_{BULKN}$ of the bias voltage generation circuit 302. The second capacitor 314 is coupled between an output terminal $PV_{BULKP}$ of the reverse bias voltage generation circuit 304 and the output terminal $PV_M$ of the modulating voltage generation circuit 310, and utilized for making the output terminal $P_{VBULKP}$ of the reverse bias voltage generation circuit 304 in a high-Z status and coupling the modulating voltage signal $V_M$ to the output terminal $PV_{BULKP}$ of the reverse bias voltage generation circuit 304. The third capacitor 316 is coupled between an output terminal PVGH of the positive voltage generation circuit 306 and the output terminal $PV_M$ of the modulating voltage generation circuit 310, and utilized for making the output terminal PVGH of the positive voltage generation circuit 306 in a high-Z status and coupling the modulating voltage signal $V_M$ to the output terminal PVGH of the positive voltage generation circuit 306. The fourth capacitor 318 is coupled between an output terminal PVGL of the negative voltage generation circuit 308 and the output terminal $PV_M$ of the modulating voltage generation circuit 310, and utilized for making the output terminal PVGL of the negative voltage generation circuit 308 in a high-Z status and coupling the modulating voltage signal $V_M$ to the output terminal PVGL of the negative voltage generation circuit 308. In this way, the output terminal $PV_{BULKN}$ and the output terminal $PV_{BULKP}$ (i.e. the bias voltage signal $V_{BULKN}$ and the reverse bias voltage signal $V_{BULKP}$) can be synchronized with the same signal (i.e. the modulating voltage signal $V_M$) as the output terminal PVGH and the output terminal PVGL (i.e. the positive voltage signal VGH and the negative voltage signal VGL), and the present invention can maintain the same VGH-VGL limit (VGH-VGL<32V) as in a pure display application even in in-cell and touch applications as shown in FIG. 6 and FIG. 7, wherein the touch can also operate at negative voltage or positive voltage as shown in FIG. 7. Please note that the above embodiment is only for illustrative purposes and is not meant to be a limitation of the present invention.

Figure 8:
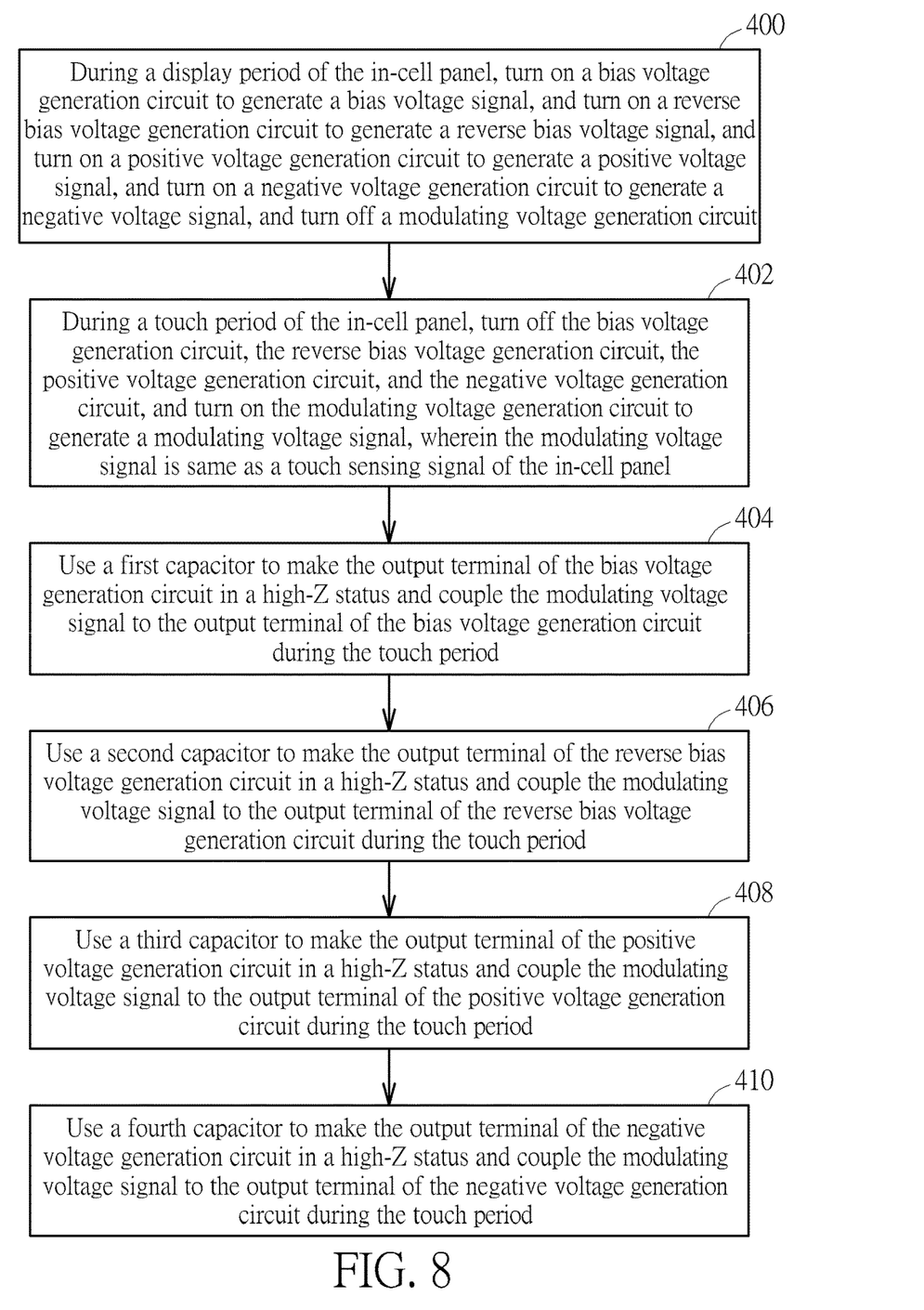
FIG. 8 shows a flowchart of controlling method of the touch panel in FIG. 4.

Please refer to FIG. 8. FIG. 8 shows a flowchart of controlling method of the (in-cell) touch panel 300 in the above embodiment of the present invention. Provided that substantially the same result is achieved, the steps of the process flowchart do not have to be in the exact order shown in FIG. 8 and need not be contiguous, meaning that other steps can be intermediate or certain steps can be ignored. The controlling method comprises the following steps:

Step 400: During a display period of the in-cell panel, turn on a bias voltage generation circuit to generate a bias voltage signal, and turn on a reverse bias voltage generation circuit to generate a reverse bias voltage signal, and turn on a positive voltage generation circuit to generate a positive voltage signal, and turn on a negative voltage generation circuit to generate a negative voltage signal, and turn off a modulating voltage generation circuit.

Step 402: During a touch period of the in-cell panel, turn off the bias voltage generation circuit, the reverse bias voltage generation circuit, the positive voltage generation circuit, and the negative voltage generation circuit, and turn on the modulating voltage generation circuit to generate a modulating voltage signal, wherein the modulating voltage signal is same as a touch sensing signal of the in-cell panel.

Step 404: Use a first capacitor to make the output terminal of the bias voltage generation circuit in a high-Z status and couple the modulating voltage signal to the output terminal of the bias voltage generation circuit during the touch period.

Step 406: Use a second capacitor to make the output terminal of the reverse bias voltage generation circuit in a high-Z status and couple the modulating voltage signal to the output terminal of the reverse bias voltage generation circuit during the touch period.

Step 408: Use a third capacitor to make the output terminal of the positive voltage generation circuit in a high-Z status and couple the modulating voltage signal to the output terminal of the positive voltage generation circuit during the touch period.

Step 410: Use a fourth capacitor to make the output terminal of the negative voltage generation circuit in a high-Z status and couple the modulating voltage signal to the output terminal of the negative voltage generation circuit during the touch period.

Briefly summarized, the touch panel and the controlling method of the touch panel disclosed by the present invention can maintain the same VGH-VGL limit (VGH-VGL<32V) as in pure display applications even in in-cell and touch applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
   a bias voltage generation circuit, for being turned on to generate a bias voltage signal during a display period of the touch panel and being turned off during a touch period of the touch panel;
   a reverse bias voltage generation circuit, for being turned on to generate a reverse bias voltage signal during the display period of the touch panel and being turned off during the touch period of the touch panel;
   a modulating voltage generation circuit, for being turned on to generate a modulating voltage signal during the touch period of the touch panel and being turned off during the display period of the touch panel, wherein the modulating voltage signal is same as a touch sensing signal of the touch panel;
   a first capacitor, coupled between an output terminal of the bias voltage generation circuit and an output terminal of the modulating voltage generation circuit, for coupling the modulating voltage signal to the output terminal of the bias voltage generation circuit and making the output terminal of the bias voltage generation circuit in a high-Z status; and
   a second capacitor, coupled between an output terminal of the reverse bias voltage generation circuit and an output terminal of the modulating voltage generation circuit, for coupling the modulating voltage signal to the output terminal of the reverse bias voltage generation circuit and making the output terminal of the reverse bias voltage generation circuit in a high-Z status.

2. The touch panel of claim 1, wherein the first capacitor and the second capacitor are formed in a flexible printed circuit (FPC) of the touch panel.

3. The touch panel of claim 1, wherein the bias voltage generation circuit, the reverse bias voltage generation circuit and the modulating voltage generation circuit are integrated in a touch controller of the touch panel.

4. The touch panel of claim 1, wherein the touch panel is an in-cell touch panel.

5. A controlling method of a touch panel, comprising:
   during a display period of the touch panel, turning on a bias voltage generation circuit to generate a bias voltage signal, turning on a reverse bias voltage generation circuit to generate a reverse bias voltage signal, and turning off a modulating voltage generation circuit;
   during a touch period of the touch panel, turning off the bias voltage generation circuit, the reverse bias voltage generation circuit, and turning on the modulating voltage generation circuit to generate a modulating voltage signal, wherein the modulating voltage signal is same as a touch sensing signal of the touch panel;
   using a first capacitor that is coupled between an output terminal of the bias voltage generation circuit and an output terminal of the modulating voltage generation circuit to couple the modulating voltage signal to the output terminal of the bias voltage generation circuit and make the output terminal of the bias voltage generation circuit in a high-Z status; and
   using a second capacitor that is coupled between an output terminal of the reverse bias voltage generation circuit and an output terminal of the modulating voltage generation circuit to couple the modulating voltage signal to the output terminal of the reverse bias voltage generation circuit and make the output terminal of the reverse bias voltage generation.

6. The controlling method of claim 5, wherein the first capacitor and the second capacitor are formed in a flexible printed circuit (FPC) of the touch panel.

7. The controlling method of claim 5, wherein the bias voltage generation circuit, the reverse bias voltage generation circuit and the modulating voltage generation circuit are integrated in a touch controller of the touch panel.

8. The controlling method of claim 5, wherein the touch panel is an in-cell touch panel.

* * * * *